US007091493B2

(12) United States Patent
Hiraoka

(10) Patent No.: US 7,091,493 B2
(45) Date of Patent: Aug. 15, 2006

(54) METHOD OF AND APPARATUS FOR IONIZING SAMPLE GAS

(75) Inventor: Kenzo Hiraoka, Yamanashi (JP)

(73) Assignee: Yamanashi TLO Co., Ltd., Yamanashi (JP)

( * ) Notice: Subject to any disclaimer, the term of this patent is extended or adjusted under 35 U.S.C. 154(b) by 84 days.

(21) Appl. No.: 10/843,596

(22) Filed: May 12, 2004

(65) Prior Publication Data

US 2005/0001161 A1 Jan. 6, 2005

(51) Int. Cl.
*G01N 21/01* (2006.01)
*G01N 21/51* (2006.01)
*G01N 23/10* (2006.01)
*G01N 23/12* (2006.01)

(52) U.S. Cl. .................. 250/425; 250/424; 250/423 R

(58) Field of Classification Search ............ 250/423 R, 250/424, 425
See application file for complete search history.

(56) References Cited

U.S. PATENT DOCUMENTS 4,372,928 A * 2/1983 Chatelet et al. ............. 423/249
6,124,675 A * 9/2000 Bertrand et al. ........ 315/111.91

OTHER PUBLICATIONS

Kenzo Hiraoka, "Principle and Application of Low-Temperature Plasmas" vol. 33, No. 5, Oct. 1985, pp. 271-306.

* cited by examiner

*Primary Examiner*—John R. Lee
*Assistant Examiner*—Jennifer Yantorno
(74) *Attorney, Agent, or Firm*—Dickstein Shapiro Morin & Oshinsky LLP

(57) ABSTRACT

Ionization efficiency is improved in Penning ionization capable of selective ionization. A metastable excited species of a rare gas is produced by introducing the rare gas into an ionization space and inducing an electrical discharge, a sample gas is introduced into the ionization space and Penning ionization is produced owing to collision between the sample gas and the metastable excited species of the rare gas. Electrons released from atoms or molecules positively ionized by Penning ionization are captured by applying a positive potential to an electron-capture electrode placed in the ionization space, and the atoms or molecules positively ionized are guided to a mass analyzer.

8 Claims, 6 Drawing Sheets

METHOD OF AND APPARATUS FOR IONIZING SAMPLE GAS

BACKGROUND OF THE INVENTION

1. Field of the Invention

This invention relates to a method of ionizing a sample gas, a method of controlling ionization and an ionization apparatus.

2. Description of the Related Art

Though a mass analyzing apparatus (mass analyzing method) is effective for the purpose of analyzing a sample gas, ionization of the sample gas is necessary in order to use this apparatus (method). A typical atmospheric ionization method in wide use at the present time is the APCI (Atmospheric Pressure Chemical Ionization) method, which utilizes corona discharge. This method brings about chemical ionization under atmospheric pressure by spraying a sample solution and simultaneously heating the same to vaporize the solvent, placing a needle-shaped high-voltage electrode in the vaporized solvent and applying a positive or negative high voltage to the electrode to thereby induce corona discharge. With APCI, first the carrier gas that is the main component is ionized by the corona discharge. For example, if air is the main component, $N_2^+$ or $O_2^+$ is generated. These ions ionize various impurities contained in the sample gas. If steam, an oxygen-containing compound (alcohol, etc.) or a nitrogen-containing component, etc., having a high degree of polarity is present as an impurity gas, then $H^+(H_2O)_n$, $H^+ROH(ROH)_n$ or $NH_4^+(NH_3)_n$ ions will eventually be generated. If hydrocarbon compounds or the like are included as impurities, almost no ionization of these takes place. There is need for a method of selectively ionizing difficult-to-ionize components such as hydrocarbons under the coexistence of alcohol or the like.

The Penning ionization method is available as a method that is capable of selectively ionizing a specific component in a sample gas. The principle of the Penning ionization method is described in Kenzo Hiraoka, "Principle and Application of Low-Temperature Plasmas", Shitsuryo-Bunseki, Vol. 33, No. 5, pp. 271–306 (1985), especially pp. 275–276 "2.2 Penning Ionization".

In Penning ionization, only atoms and molecules having an ionization energy lower than the metastable energy of a metastable excited species are converted to positive ions selectively. Electrons are released from atoms or molecules in the course of positive ionization. If these electrons recombine with positive ions, however, ionization efficiency declines.

SUMMARY OF THE INVENTION

Accordingly, a main object of the present invention is to raise ionization efficiency in Penning ionization.

Another object of the present invention is to provide an ionization method utilizing the structure of an ionization apparatus suited to Penning ionization and the ionization apparatus.

According to the present invention, the foregoing objects are attained by providing a method of ionizing a sample gas, comprising the steps of: generating a metastable excited species of a rare gas (a gas to be excited) by introducing the rare gas into an ionization space and exciting the rare gas; introducing a sample gas into the ionization space and inducing Penning ionization owing to collision between the metastable excited species of the rare gas and the sample gas; applying a positive potential to an electron-capture electrode placed in the ionization space and capturing electrons released from atoms or molecules that undergo positive ionization owing to Penning ionization; and guiding atoms or molecules that have undergone positive ionization to a mass analyzer.

Rare gas approximately at atmospheric pressure is introduced into and made to fill a closed space (an ionization space) formed by a housing or the like (inclusive of means formed by an orifice and diaphragm, described later). Preferably, a rare gas is introduced into an ionization space and is discharged from the ionization space to form a stream of the rare gas. There are a variety of methods in which excitation of rare gas includes photoexcitation. However, excitation by electrical discharge is preferred, and corona discharge or high-frequency discharge is particularly desirable. A corona-discharge electrode is placed in the ionization space in order to induce corona discharge and a negative voltage is applied to this electrode. In case of high-frequency discharge as well, an electrode for high-frequency discharge is placed in the ionization space and a high frequency is applied to this electrode. As a result, a discharge is induced through the rare gas and the rare gas is excited, whereby a metastable excited species is produced.

A sample gas that includes the gas to be ionized is introduced into the ionization space. If there is only a trace amount of sample gas, it will suffice to introduce the sample gas together with a carrier gas (hydrogen gas or rare gas, etc.). In a case where the sample is a liquid, a vapor of the liquid sample can be introduced into the ionization space while mixed and conveyed with the carrier gas. An isolated gas component that is output from (that flows out of) a gas chromatograph may be introduced into the ionization space.

Penning ionization is produced by collision between the sample gas and the metastable excited species of the rare gas produced by excitation. In Penning ionization, positive ionization takes place selectively only with regard to atoms or molecules contained in a sample gas having an ionization energy lower that the metastable energy possessed by a metastable excited species of the rare gas. Electrons are released from atoms or molecules in the course of Penning ionization.

Electrons released from atoms or molecules that undergo positive ionization (these atoms or molecules shall be referred to collectively as an ionized gas or ionized-gas particles) by Penning ionization are captured (absorbed) by a capture electrode placed in the ionization space and supplied with a positive potential. As a result, recombination of the ionized gas with electrons is prevented.

Preferably, it is so arranged that a flow of rare gas is produced in the ionization space, a metastable excited species of the rare gas is produced on the upstream side of the flow (namely in the vicinity of the location where the rare gas is introduced), and Penning ionization is induced on the downstream side of the flow (in the vicinity of the location where the sample gas is introduced). Rare gas that has returned to the ground electronic state by application of energy to the sample gas is discharged from the interior of the ionization space.

Positive ionized gas particles are guided to a mass analyzer as by forming an electric field. Of course, a housing (case) or the like that defines the ionization space is formed to have a miniscule hole that directs the positive ionized gas particles toward the mass analyzer.

The mass analyzer may be a mass spectrometer that obtains a mass spectrum by measuring ions while continuously increasing or decreasing an accelerating voltage or the strength of a magnetic field, a time-of-flight spectrometer, which utilizes the fact that the time it takes for an ion to traverse a fixed distance differs owing to the fact that even ions for which the same energy is obtained exhibit different speeds if their masses differ, or a spectrometer that utilizes resonance oscillation of ions in a high-frequency electric field.

A method of controlling ionization of a sample gas according to the present invention comprises steps of forming an ionization space by a housing in which has been formed a miniscule hole for introducing an ionized sample gas to a mass analyzer; placing a discharge electrode and an electron-capture electrode in the ionization space in a state in which they are insulated from the housing; introducing a rare gas into the ionization space and producing an electric discharge by applying electrical energy to the discharge electrode; and introducing a sample gas into the ionization space and applying a positive voltage to the electron-capture electrode. Electrons released from the sample gas that undergoes positive ionization owing to collision between the sample gas and the metastable excited species of the rare gas produced by electric discharge can be captured by applying a positive voltage to the electron-capture electrode. The positive ionized sample gas is guided from the ionization space to the mass analyzer through the miniscule hole in the housing. The rare gas that has returned to the ground electronic state by Penning ionization is discharged from the ionization space. The electron-capture electrode is placed in the vicinity of the sample gas introduction port.

Recombination of ions and electrons is prevented in this ionization control method also because the electrons produced in Penning ionization are captured by the electron-capture electrode.

An apparatus for ionizing a sample gas according to the present invention comprises: a housing, which defines an ionization space, formed to have a miniscule hole for introducing an ionized sample gas to a mass analyzer; a discharge electrode placed in the ionization space and supported on the housing in an insulated state; a rare gas introduction port formed in the housing for introducing a rare gas into the ionization space; a rare gas discharge port formed in the housing for discharging the rare gas from the ionization space; a sample gas introduction port formed in the housing for introducing a sample gas into the ionization space; and an electron-capture electrode to which a positive potential is applied for capturing electrons produced by Penning ionization.

Expressed more specifically, the apparatus for ionizing a sample gas according to the present invention comprises: a diaphragm having a recess for forming an ionization space in cooperation with an orifice in which a miniscule hole is formed for introducing an ionized sample gas to a mass analyzer; a discharge electrode placed in the ionization space and supported on the diaphragm in an insulated state; a rare gas introduction port formed in the diaphragm for introducing a rare gas into the ionization space; a rare gas discharge port formed in the diaphragm for discharging the rare gas from the ionization space; a sample gas introduction port formed in the diaphragm for introducing a sample gas into the ionization space; and an electron-capture electrode to which a positive potential is applied for capturing electrons produced by Penning ionization.

In general, a rare gas supply tube (which may be flexible), a rare gas discharge tube (which may be flexible) and a sample gas supply tube (which may be flexible) are connected to the rare gas introduction port, rare gas discharge port and sample gas introduction port, respectively.

Though the ionization space is formed by an orifice and diaphragm, the entirety can be referred to as a housing or the like. In a preferred embodiment, the discharge electrode is placed in the vicinity of the rare gas introduction port. Further, it is preferred that the electron-capture electrode be placed in the vicinity of the sample gas introduction port. It is further preferred that the miniscule hole be situated in the vicinity of the sample gas introduction port in order to guide the generated ions to the mass analyzer effectively. Though the rare gas discharge port also serves as a discharge port for sample gas that has not been ionized, it is desirably placed close to the sample gas introduction port.

In a preferred embodiment, the sample gas supply tube (sample gas introduction tube) serves also as the electron-capture electrode. In such case the sample gas supply tube is formed by an electrical conductor (made of metal) and an opening at the tip thereof serves as the sample gas introduction port. Though the tip of the sample gas supply tube is worked as necessary to have a pointed cross section in order to implement electron capture effectively, the pointed shape is not necessary required.

In an embodiment, a substantially cylindrical (e.g., circular cylindrical) ionization space (of low height) is formed by an orifice and a diaphragm that has a recess, the rare gas is introduced into the ionization space at the periphery thereof, and a metastable excited species of the rare gas is produced by electrical discharge (corona discharge or high-frequency discharge). The metastable excited species of the rare gas flows toward the center of the ionization space and it is here that Penning ionization occurs. The sample gas is introduced to the center of the ionization space and capture of electrons is carried out. Rare gas that has returned to the ground electronic state at the center of the ionization space is discharged from the ionization space and ionized gas particles are introduced to the mass analyzer from a miniscule hole in the orifice, which is provided near the center of the ionization space.

Of course, in a case where the rare gas forms a flow within the ionization space, it will suffice if electrical discharge is induced upstream of this flow in the ionization space and Penning ionization brought about downstream of the flow, and therefore it goes without saying that the ionization space is not limited to a substantially cylindrical (circular cylindrical) space. That is, the rare gas is excited owing to placement of the discharge electrode in the vicinity of the rare gas introduction port. Electrons produced by Penning ionization are captured owing to placement of the electron-capture electrode in the vicinity of the sample gas introduction port.

An ionization apparatus according to the present invention having a substantially circular cylindrical ionization space comprises: a diaphragm having a recess for forming an ionization space in cooperation with an orifice in which a miniscule hole is formed at the center thereof for introducing an ionized sample gas to a mass analyzer; a discharge electrode placed in the ionization space at the periphery thereof and supported on the diaphragm in an insulated state; a rare gas introduction port formed in the diaphragm at the periphery of the ionization space for introducing a rare gas into the ionization space; a rare gas discharge port formed in a central portion of the diaphragm for discharging the rare gas from the ionization space; and a sample gas introduction tube placed in such a manner that a tip thereof faces the rare gas discharge port, the tip acting as an electron-capture electrode.

In accordance with this ionization apparatus, the (electrically conductive) sample gas introduction tube (supply tube)

and the electron-capture electrode are shared. The structure of the apparatus is simplified as a result.

Thus, in accordance with the present invention, a sample gas is subjected to Penning ionization using a metastable excited species of a rare gas and therefore only atoms or molecules having an ionization energy lower than the metastable energy of the rare gas can be selectively ionized. Further, an electron-capture electrode is provided in an ionization space and electrons produced by ionization are captured. As a result, electrons produced by ionization of a sample gas are prevented from recombining with ions and the ionization efficiency of the ions eventually obtained is raised.

Ionization by another principle can also be achieved utilizing all or part of the above-described structure of the apparatus suited to Penning ionization, and the present invention also provides such an ionization method and ionization apparatus.

A method of ionizing a sample gas according to the present invention comprises steps of forming an ionization space in a housing in which has been formed a miniscule hole for introducing an ionized sample gas to a mass analyzer; introducing a carrier gas into the ionization space and causing the carrier gas to be discharged from a carrier gas discharge port to thereby fill the ionization space with the carrier gas or cause the carrier gas to flow therethrough; introducing a sample gas into the ionization space through a sample gas introduction tube that has been placed in such a manner that a tip thereof faces the rare gas discharge port, and applying a negative voltage to the sample gas introduction tube to produce an electrical discharge; and generating negative ions by causing electrons produced by the electrical discharge to attach themselves to atoms or molecules of the sample gas.

It will suffice if the carrier gas is one that will induce an electrical discharge (corona discharge), and a rare gas or oxygen gas, etc., is used. Electrons produced by the discharge (e.g., corona discharge) attach themselves to atoms or molecules having a positive electron affinity in the sample gas, and negative ions are produced. The negative ions produced are guided to a mass analyzer.

An apparatus for ionizing a sample gas according to the present invention comprises: a housing for forming an ionization space and in which has been formed a miniscule hole for introducing an ionized sample gas to a mass analyzer; a carrier gas introduction port formed in the housing for introducing a carrier gas into the ionization space; a carrier gas discharge port formed in the housing for discharging the carrier gas from the ionization space; a sample gas introduction port formed in the housing for introducing a sample gas into the ionization space; and a discharge electrode placed in the ionization space in close proximity to the sample gas introduction port.

Expressed more specifically, the apparatus for ionizing a sample gas according to the present invention comprises: a diaphragm having a recess for forming an ionization space in cooperation with an orifice in which a miniscule hole is formed at the center thereof for introducing an ionized sample gas to a mass analyzer; a carrier gas introduction port, which is for introducing a carrier gas into the ionization space, formed in the diaphragm at the periphery of the ionization space; a carrier gas discharge port formed in a central portion of the diaphragm for discharging the carrier gas from the ionization space; and a sample gas introduction tube placed in such a manner that a tip thereof faces the carrier gas discharge port, the tip acting as a corona-discharge electrode in response to application of a negative voltage.

This ionization apparatus can be realized by utilizing the above-described basic structure of the apparatus for Penning ionization as is or by modifying the structure in part. Whereas positive ions are generated by an apparatus for Penning ionization, negative ions are produced by the above ionization apparatus.

DESCRIPTION OF THE PREFERRED EMBODIMENTS

First Embodiment

Figure 1:
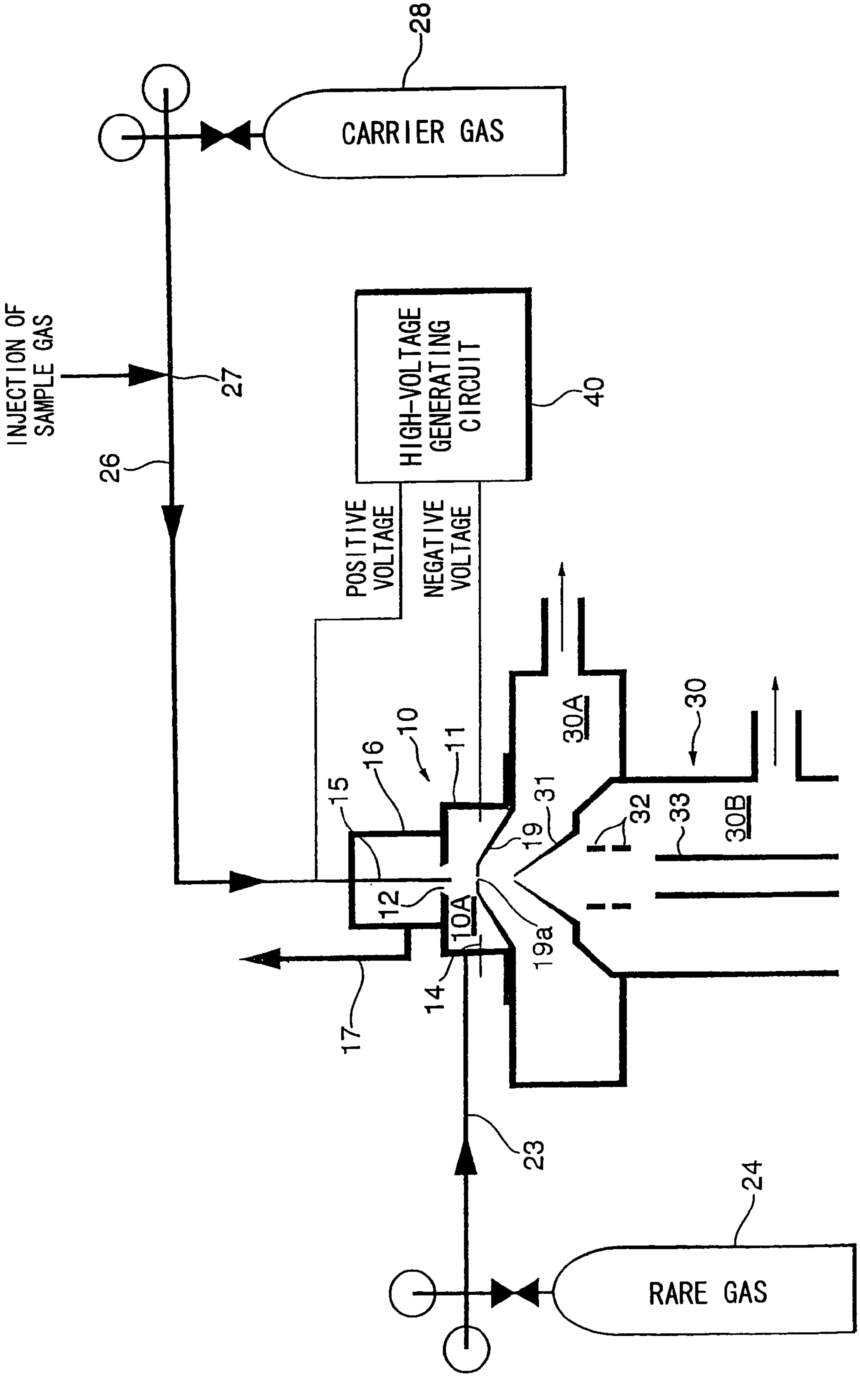
FIG. 1 is a diagram illustrating a mass analyzing system in its entirety.

FIG. 1 illustrates the overall configuration of a system for analyzing a sample gas.

An ionization apparatus 10 is mounted on a mass analyzer (a quadrupole mass spectrometer in this embodiment) 30. More specifically, an ionization space 10A is formed by an orifice 19, which is secured to the mass analyzer 30 and provided at its center with a miniscule hole 19*a* for introducing ions into the mass analyzer 30, and a diaphragm 11 secured to the mass analyzer 30 and having a substantially circular cylindrical recess. The orifice 19 and diaphragm 11 are both made of an electrical conductor (metal).

A rare gas at approximately atmospheric pressure is introduced into the ionization space 10A at a plurality of locations at the periphery thereof from a rare gas cylinder 24 through a rare gas supply tube (which is flexible) 23. A corona-discharge electrode 14 is provided inside the ionization space 10A at the periphery thereof in the vicinity of rare gas introduction ports of the diaphragm 11. A high voltage (e.g., −500 to −2000 V) is applied to the corona-discharge electrode 14 by a high-voltage generating circuit 40, and the rare gas is excited by a corona discharge within the ionization space 10A so that a metastable excited species of the rare gas is produced.

Figure 6:
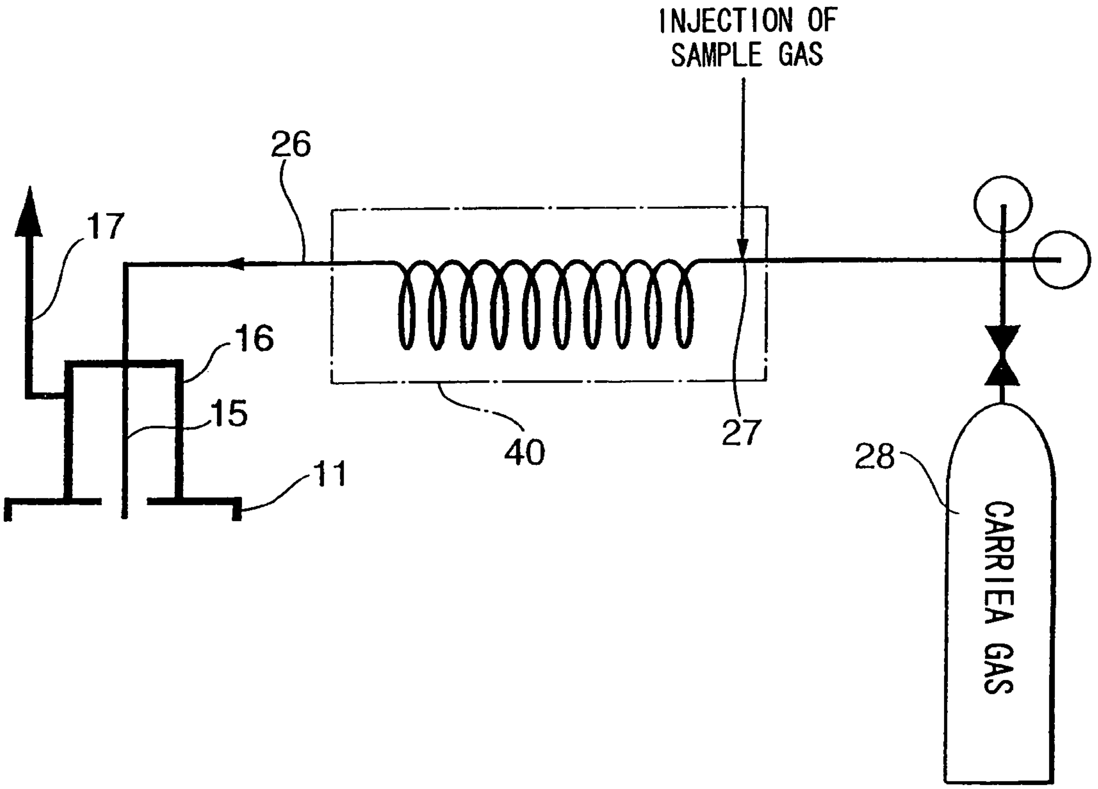
FIG. 6 is a diagram illustrating part of the modification of sample gas introduction that corresponds to part of FIG. 1.

The central portion of the diaphragm 11 is provided with a rare gas discharge port (which is also a discharge port for a sample gas, etc.) 12. A cylindrical body (a cap or exhaust cylinder, which is formed of an insulator such as a synthetic resin, glass, quartz or ceramic) 16 is secured to the diaphragm 11 so as to cover the discharge port 12. A sample gas introduction capillary (made of metal) 15 is secured to the cylindrical body 16 at base end thereof. The tip of the capillary 15 extends in the direction of the diaphragm 11 and faces the discharge port 12. The sample gas introduction capillary 15 serves also as an electron-capture electrode and has a positive voltage (e.g., +500 to +1000 V) generated by the high-voltage generating circuit 40 applied thereto. Further, a sample gas supply tube 26 is connected to the sample gas introduction capillary 15, and the sample gas supply tube (which is flexible) 26 is supplied with a carrier gas by the a gas cylinder 28. While the carrier gas is supplied, a sample gas to be analyzed is injected into the sample gas supply tube 26 at an injection point 27 along the length of the tube. For example, the sample gas can be supplied (by microinjection) to a rubber or cork portion of the sample gas supply tube by an injection needle. The sample gas is transported with the carrier gas and introduced into the ionization space 10A. As shown in FIG. 6, it is also possible to adopt an arrangement in which a gas chromatograph 40 is provided on the sample gas supply tube 26 at a point along its length, gas components isolated by the gas chromatograph 40 are supplied successively to the ionization apparatus 10, ionization is performed and then analysis is performed successively in the mass analyzer 30.

The following Penning ionization is produced in the vicinity of the tip of sample gas introduction capillary 15 inside the ionization space 10A:

$$A^*+B\rightarrow A+B^++e$$

where A* is a metastable excited species of the rare gas, and B is an atom or molecule in the sample gas.

The metastable excited species produced by corona discharge and the atoms or molecules in the sample gas collide, the atoms or molecules are ionized by the energy of the metastable excited species and electrons e are emitted. The metastable excited species of the rare gas returns to the ground electronic state when energy is released. In Penning ionization, only atoms or molecules having an ionization energy lower than the metastable energy of metastable excited species are ionized selectively.

Examples of rare gases are helium (He), neon (Ne), argon (Ar), krypton (Kr) and xenon (Xe). To give one example, the metastable energy of argon is 11.5 eV. The above-mentioned rare gases, hydrogen and oxygen, etc., can be used as the carrier gas as well.

Electrons released owing to Penning ionization are captured by the tip of the sample gas introduction capillary 15 to which the positive high voltage is applied. This makes it possible to prevent recombination of ions and electrons.

The ionized atoms or molecules are introduced into the mass analyzer 30 from the miniscule hole 19*a* of the orifice 19 by applying suitable voltages to the diaphragm 11 and orifice 19 and producing a potential gradient.

The rare gas that has returned to the ground state enters the cap 16 from the discharge port 12 and is discharged to the outside through an exhaust tube 17.

The mass analyzer 30 is of the differential exhaust type and has an inlet chamber 30A and an analyzing chamber 30B. The inlet chamber 30A is exhausted to about $10^{-3}$ Torr, and the analyzing chamber 30B is exhausted to about $10^{-6}$ Torr. Ions enter the inlet chamber 30A from the miniscule hole 19*a* of orifice 19 and enter the analyzing chamber 30B through a miniscule hole in a skimmer 31. An electron lens 32 and an analyzing tube 33 are disposed inside the analyzing chamber 30B, and the ions are focused by the electron lens 32 and then introduced into the analyzing tube 33.

It should be noted that a voltage generating circuit and connections for applying a suitable voltage to the diaphragm 11 and orifice 19 are deleted from FIG. 1.

Figure 2:
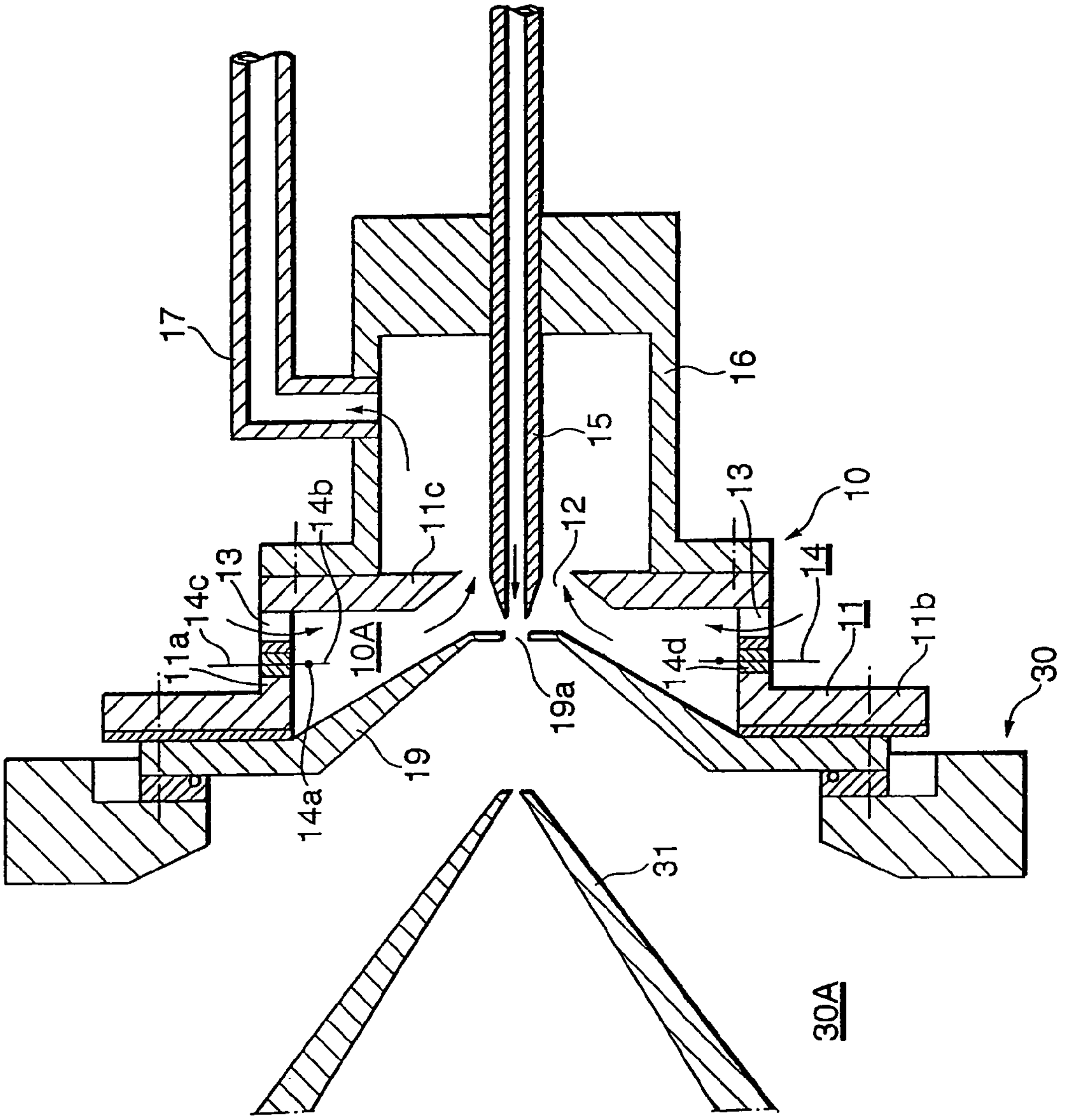
FIG. 2 is a longitudinal sectional view illustrating an ionization apparatus according to a first embodiment of the present invention.
Figure 3:
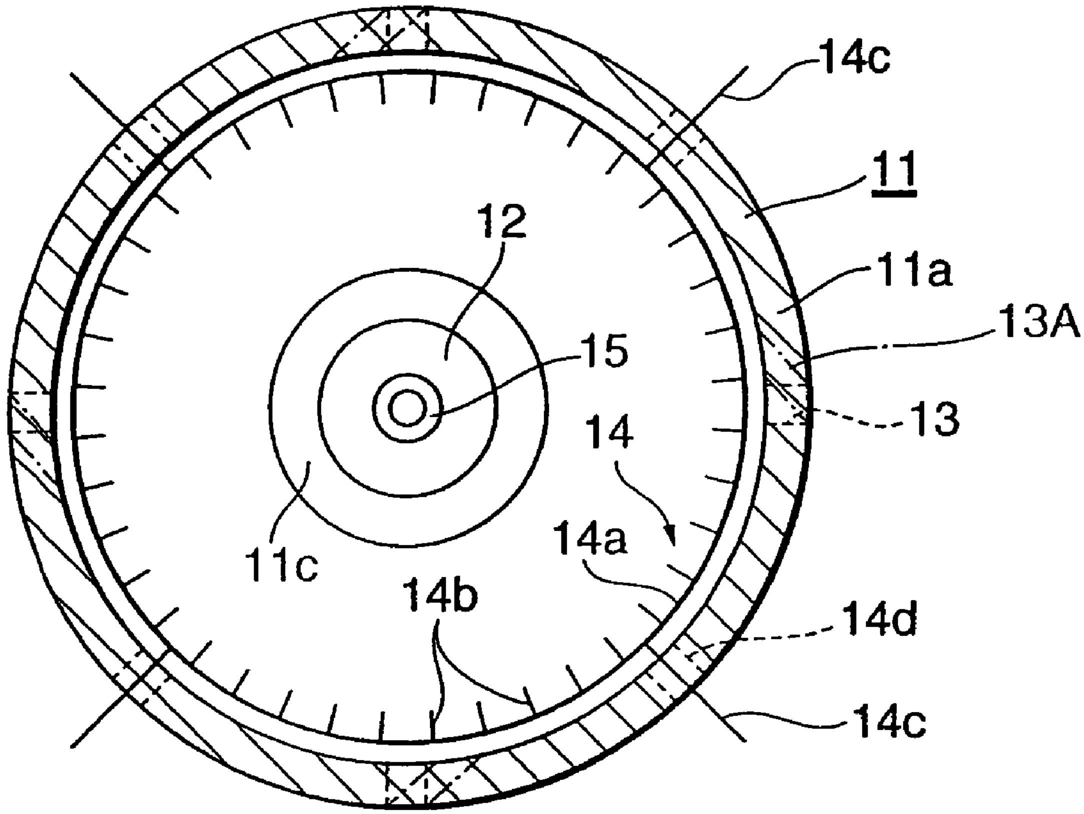
FIG. 3 is a transverse sectional view of the ionization apparatus.

FIGS. 2 and 3 illustrate the entirety of the ionization apparatus.

The diaphragm 11 is equipped with an outwardly projecting circular cylindrical portion 11*a* of small height and a surrounding flange portion 11*b* so as to form a recess (the ionization space 10A) therein. The diaphragm 11 is secured by screws to the mass analyzer 30 together with the orifice 19. Insulators are provided between the diaphragm 11 and the orifice 19 and between the orifice 19 and the mounting wall of the mass analyzer 30. The orifice 19 is formed conical in shape so as to project into the circular cylindrical portion 11*a* of the diaphragm 11. The tip of the orifice 19 has the miniscule hole 19*a*. In order to guide ions produced in the ionization space 10A to the miniscule hole 19*a* of orifice 19, a voltage of about +350 V is applied to the diaphragm 11 and a voltage of about +50 V to the orifice 19.

The peripheral surface of the circular cylindrical portion 11*a* of diaphragm 11 is provided with rare gas introduction ports 13 at four locations, and the rare gas supply tube 23 (not shown in FIGS. 2 and 3) is connected to the rare gas introduction ports 13. The corona-discharge electrode 14 is placed on the inner side of the circular cylindrical portion 11*a* of diaphragm 11. The electrode 14 comprises an annular portion 14*a*, a number of needles 14*b* projecting inward from the annular portion 14*a*, and terminals 14*c* supporting the annular portion 14*a*. The terminals 14*c* are led to the outside through an insulator 14*d* provided on the circular cylindrical portion 11*a* of diaphragm 11 and are connected to the high-voltage generating circuit 40.

The discharge port 12 is provided at the central portion of a bottom wall 11*c* of the circular cylindrical portion 11*a* of diaphragm 11. The periphery of the discharge port 12 is formed to have a tapered shape in such a direction that the diameter of the opening diminishes in the outward direction from the interior.

Figure 5:
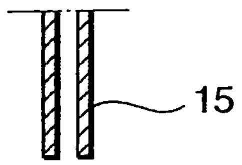
FIG. 5 is a sectional view illustrating the tip of a sample gas introduction capillary according to a modification of the first embodiment.

The cylindrical body 16 is secured to the bottom wall 11*c* by screws. A hole is formed in the bottom wall of the cylindrical body 16 and the sample gas introduction capillary 15 is passed through and supported by the hole. The tip of the capillary 15 is passed through the discharge port 12 (there is a gap between the periphery of the discharge port 12 and the capillary) and projects slightly into the ionization space 10A inside the diaphragm 11. The tip of the capillary 15 is pointed when viewed in cross section. More specifically, the outer circumferential surface of the capillary at the tip thereof is tapered in such a manner that the thickness of the capillary wall decreases as the end of the tip is approached. The capillary 15 is connected to the sample gas supply tube 26 and has a positive high voltage applied thereto by the high-voltage generating circuit 40. The tip of the sample gas introduction capillary 15 is sufficient for the purpose of capturing electrons even if it is not made pointed, as shown in FIG. 5.

The circumferential wall of the cylindrical body 16 is formed to have a rare gas discharge port to which the rare gas exhaust tube 17 is connected.

Figure 4:
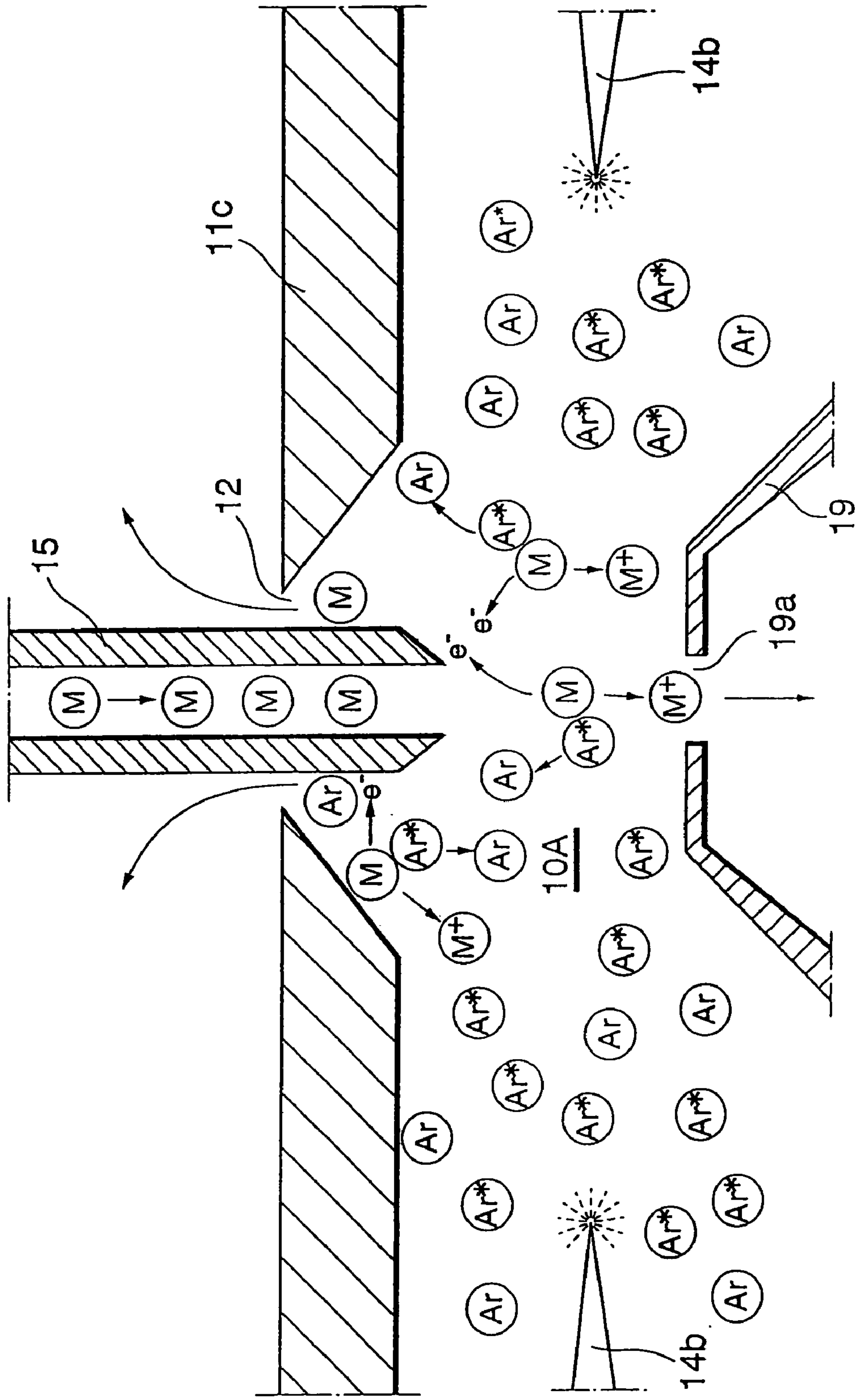
FIG. 4 is an explanatory view illustrating the process of ionization.

The process through which ions are produced will be described with reference to FIG. 4. In FIG. 4, the corona-discharge electrode (the needles 14*b* thereof) is drawn in a state in which it is fairly closes to the sample gas introduction capillary 15.

A rare gas [e.g., argon (Ar)] substantially at atmospheric pressure is introduced into the ionization space 10A from the introduction ports 13. The rare gas Ar flows slowly from the periphery of the ionization space 10A toward the center thereof. When negative voltage is impressed upon the corona-discharge electrode 14, a corona discharge is produced, the argon gas Ar is excited and a metastable excited species Ar* thereof is generated. The metastable excited species Ar* also flows toward the center of the ionization space 10A.

The tip of the sample gas introduction capillary 15 faces the center of the ionization space 10A. A sample gas is supplied together with a carrier gas (e.g., H, He or Ar) from the sample gas introduction capillary 15. The sample gas (which is represented by M) and the metastable excited species Ar* collide, the sample gas M is ionized by the above-described Penning ionization, and $M^+$ and $e^-$ are produced. The electrons $e^-$ are captured by the capillary 15 to which the positive high-voltage is applied. The argon Ar that has returned to the ground state, other argon, the carrier gas and sample gas that has not been ionized diffuse into the cylindrical body 16 from the discharge port 12 and are discharged to the outside through the exhaust tube 17. The ionized sample gas $M^+$ is guided into the mass analyzer 30 through the miniscule hole 19*a* of orifice 19.

In this embodiment, the circular cylindrical portion 11*a* of the diaphram is provided with the rare gas introduction ports 13 along directions pointing toward the center. However, as indicated by the phantom lines 13A in FIG. 3, it may be so arranged that the circular cylindrical portion 11*a* is provided with introduction ports pointing away from the center so that the rare gas that has been introduced from these introduction ports will swirl within the ionization space and approach the center thereof. Further, it goes without saying that the ionization space is not limited to a circular cylinder in shape. For example, it will suffice to place a corona-discharge electrode in the vicinity of a rare gas introduction port in a part of the ionization space and provide an electron-capture electrode, discharge port and an ion-leading port to the mass analyzer in the vicinity of a sample gas introduction port. The electron-capture electrode need not also serve as the sample gas introduction capillary. Furthermore, it is possible to produce a metastable excited species of a rare gas not only by a corona discharge but also by a high-frequency discharge. The sample gas need not be introduced together with a carrier gas. In a case where the sample is a liquid, a vapor of this liquid can be introduced together with the carrier gas.

Second Embodiment

Figure 7:
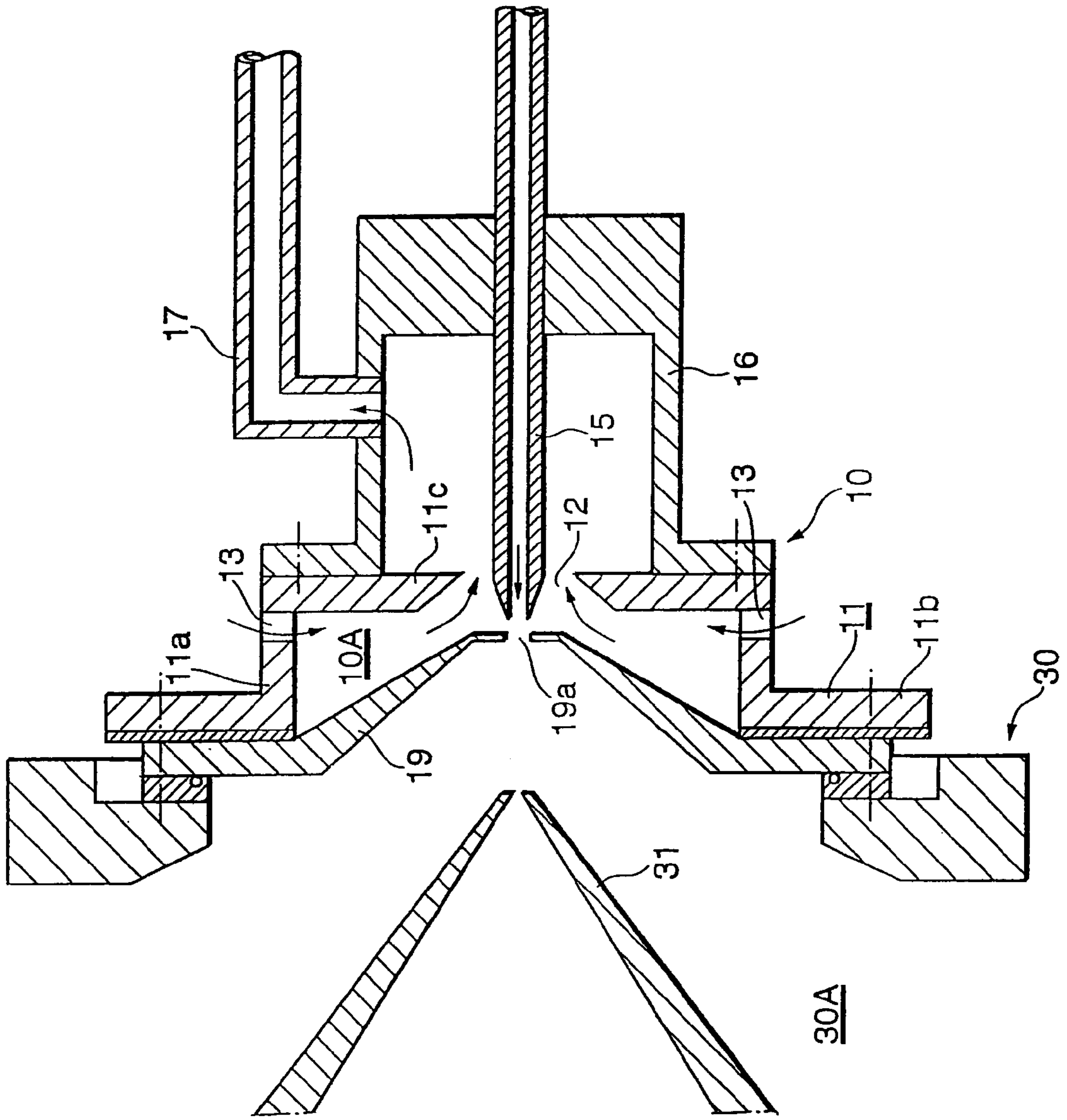
FIG. 7 is a longitudinal sectional view illustrating an ionization apparatus according to a second embodiment of the present invention.

FIG. 7 illustrates an ionization apparatus according to a second embodiment of the present invention. This ionization apparatus differs from that shown in FIG. 2 only in that the corona-discharge electrode 14 is not provided; other structural aspects are the same as those of the ionization apparatus shown in FIG. 2. Accordingly, components identical with those shown in FIG. 2 are designated by like reference characters and need not be described again.

The ionization apparatus of the second embodiment produces negative ions. Accordingly, the ionization apparatus illustrated in FIG. 7 is used (operated) in a manner different from that of the ionization apparatus shown in FIG. 2.

A carrier gas such as a rare gas or oxygen is introduced into the ionization space 10A from the introduction ports 13 and produces a flow, and a negative high voltage (e.g., −500 to −3000V) is applied to the sample gas introduction capillary 15 to produce a corona discharge at the tip of the capillary 15. A sample gas to be ionized is supplied to the interior of the ionization space 10A from the sample gas introduction capillary 15. Electrons produced by the discharge attach themselves to atoms or molecules having a positive electron affinity in the sample gas, and negative ions are produced. The negative ions produced are sent to the mass analyzer from the miniscule hole 19*a* of orifice 19. A halogenated organic compound such as Freon gas can be subjected to mass analysis through this method.

The Penning ionization method according to the first embodiment ionizes atoms and molecules by Penning ionization, captures the generated electrons by an electron-capture electrode (sample gas introduction port) serving also as a sample gas introduction capillary, extracts positive ions efficiently and guides them to a mass analyzer. By contrast, the ionization method according to the second embodiment applies a negative high voltage to an electron-capture electrode (sample introduction port) serving also as a sample gas introduction capillary, thereby producing a corona discharge at the tip of the electrode and converting atoms and molecules to negative ions. The negative ions are supplied to the mass analyzer. Accordingly, the ionization method of the second embodiment can be implemented even if the ionization apparatus of the first embodiment is used as is. That is, a negative high voltage need only be applied to the sample gas introduction capillary 15 in a state in which no voltage is applied to the corona-discharge electrode 14.

In the second embodiment also a corona-discharge electrode may be provided in the vicinity of the sample gas introduction port without using the sample gas introduction capillary as a corona-discharge electrode. In addition, all of the modifications described above in relation to the first embodiment are applicable to the second embodiment as well.

What is claimed is:

1. A method of ionizing a sample gas, comprising the steps of: generating a metastable excited species of a rare gas by introducing the rare gas into an ionization space at substantially atmospheric pressure and exciting the rare gas; introducing a sample gas into the ionization space and inducing Penning ionization owing to collision between the metastable excited species of the rare gas and the sample gas; applying a positive potential to an electron-capture electrode placed in the ionization space and capturing electrons released from atoms or molecules that undergo positive ionization owing to Penning ionization; and guiding atoms or molecules that have undergone positive ionization to a mass analyzer.

2. A method of controlling ionization of a sample gas, comprising the steps of: forming an ionization space in a housing in which has been formed a miniscule hole for introducing an ionized sample gas to a mass analyzer; placing a discharge electrode and an electron-capture electrode in the ionization space in a state in which they are insulated from the housing; introducing a rare gas into the ionization space at substantially atmospheric pressure and producing an electric discharge by applying electrical energy to the discharge electrode; and introducing a sample gas into the ionization space and applying a positive voltage to the electron-capture electrode.

3. An apparatus for ionizing a sample gas, comprising: a housing, which defines an ionization space, formed to have a miniscule hole for introducing an ionized sample gas to a mass analyzer; a discharge electrode placed in the ionization space and supported on said housing in an insulated state; a rare gas introduction port formed in the housing for introducing a rare gas into the ionization space at substantially atmospheric pressure; a rare gas discharge port formed in said housing for discharging the rare gas from the ionization space; a sample gas introduction port formed in said housing for introducing a sample gas into the ionization space; and an electron-capture electrode to which a positive potential is applied for capturing electrons produced by Penning ionization.

4. An apparatus for ionizing a sample gas, comprising: a diaphragm having a recess for forming an ionization space in cooperation with an orifice in which a miniscule hole is formed for introducing an ionized sample gas to a mass analyzer; a discharge electrode placed in the ionization space and supported on said diaphragm in an insulated state; a rare gas introduction port formed in said diaphragm for introducing a rare gas into the ionization space at substantially atmospheric pressure; a rare gas discharge port formed in said diaphragm for discharging the rare gas from the ionization space; a sample gas introduction port formed in said diaphragm for introducing a sample gas into the ionization space; and an electron-capture electrode to which a positive potential is applied for capturing electrons produced by Penning ionization.

5. An apparatus for ionizing a sample gas, comprising: a diaphragm having a recess for forming an ionization space in cooperation with an orifice in which a miniscule hole is formed for introducing an ionized sample gas to a mass analyzer; a discharge electrode placed in the ionization space at the periphery thereof and supported on said diaphragm in an insulated state; a rare gas introduction port formed in said diaphragm at the periphery of the ionization space for introducing a rare gas into the ionization space at substantially atmospheric pressure; a rare gas discharge port formed in a central portion of said diaphragm for discharging the rare gas from the ionization space; and a sample gas introduction tube placed in such a manner that a tip thereof faces said rare gas discharge port, said tip acting as an electron-capture electrode.

6. A method of ionizing a sample gas, comprising the steps of: forming an ionization space in a housing in which has been formed a miniscule hole for introducing an ionized sample gas to a mass analyzer; introducing a carrier gas into the ionization space and causing the carrier gas to be discharged from a carrier gas discharge port to thereby fill the ionization space with the carrier gas or cause the carrier gas to flow therethrough; introducing a sample gas into the ionization space through a sample gas introduction tube that has been placed in such a manner that a tip thereof faces the carrier gas discharge port, and applying a negative voltage to the sample gas introduction tube to produce an electrical discharge; and generating negative ions by causing electrons produced by the electrical discharge to attach themselves to atoms or molecules of the sample gas.

7. An apparatus for ionizing a sample gas, comprising: a housing for forming an ionization space and in which has been formed a miniscule hole for introducing an ionized sample gas to a mass analyzer; a carrier gas introduction port formed in said housing for introducing a carrier gas into the ionization space; a carrier gas discharge port formed in said housing for discharging the carrier gas from the ionization space; a sample gas introduction port formed in said housing for introducing a sample gas into the ionization space; and a discharge electrode placed in the ionization space in close proximity to said sample gas introduction port.

8. An apparatus for ionizing a sample gas, comprising: a diaphragm having a recess for forming an ionization space in cooperation with an orifice in which a miniscule hole is formed at the center thereof for introducing an ionized sample gas to a mass analyzer; a carrier gas introduction port, which is for introducing a carrier gas into the ionization space, formed in said diaphragm at the periphery of the ionization space; a carrier gas discharge port formed in a central portion of the diaphragm for discharging the carrier gas from the ionization space; and a sample gas introduction tube placed in such a manner that a tip thereof faces said carrier gas discharge port, said tip acting as a corona-discharge electrode in response to application of a negative voltage.

* * * * *